(12) United States Patent
Garrett et al.

(10) Patent No.: US 10,656,649 B1
(45) Date of Patent: May 19, 2020

(54) SENSOR CONTROLLED DRIVE UNIT INGRESS AND EGRESS

(71) Applicant: Amazon Technologies, Inc., Seattle, WA (US)

(72) Inventors: Samuel Gardner Garrett, Seattle, WA (US); Patrick Mahaney, Houston, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/540,774

(22) Filed: Aug. 14, 2019

Related U.S. Application Data

(63) Continuation of application No. 15/619,294, filed on Jun. 9, 2017, now Pat. No. 10,409,281.

(51) Int. Cl.
| | |
|---|---|
| *G06F 7/00* | (2006.01) |
| *G05D 1/00* | (2006.01) |
| *G05D 1/02* | (2020.01) |
| *G06K 7/10* | (2006.01) |
| *G06Q 10/08* | (2012.01) |

(52) U.S. Cl.
CPC ......... *G05D 1/0088* (2013.01); *G05D 1/0225* (2013.01); *G06K 7/10366* (2013.01); *G06Q 10/087* (2013.01); *G05D 2201/0216* (2013.01)

(58) Field of Classification Search
None
See application file for complete search history.

(56) References Cited

U.S. PATENT DOCUMENTS

| | | | |
|---|---|---|---|
| 8,280,547 B2 | 10/2012 | D'Andrea et al. | |
| 9,087,314 B2 | 7/2015 | Hoffman et al. | |
| 2002/0165638 A1* | 11/2002 | Bancroft | A47F 10/00 700/213 |
| 2007/0129849 A1* | 6/2007 | Zini | G05B 19/41895 700/258 |
| 2009/0234499 A1 | 9/2009 | Nielsen et al. | |
| 2016/0009303 A1* | 1/2016 | Spahis | B61L 15/0018 701/19 |
| 2017/0151971 A1* | 6/2017 | Shubs, Jr. | B61L 27/0094 |
| 2017/0158430 A1 | 6/2017 | Raizer | |
| 2017/0361465 A1 | 12/2017 | Zevenbergen | |

OTHER PUBLICATIONS

U.S. Appl. No. 15/619,294, "Non-Final Office Action", dated Jan. 11, 2019, 12 pages.
U.S. Appl. No. 15/619,294, "Notice of Allowance", dated May 2, 2019, 6 pages.

\* cited by examiner

*Primary Examiner* — Yolanda R Cumbess
(74) *Attorney, Agent, or Firm* — Kilpatrick Townsend & Stockton LLP

(57) ABSTRACT

A monitoring system for automated detection of egress or ingress of a drive unit between first and second spaces in an inventory system includes a path for conveying the drive unit between the first and second spaces that defines an intermediate space between the two spaces. A sensor is configured to detect passage of the drive unit between the first space and the intermediate space, and an identification sensor is arranged to read an identifier of the drive unit. In combination with an inventory management system, the monitoring system can be used to update and maintain accuracy of a virtual representation of a physical inventory space that employs automated drive units or shuttles.

20 Claims, 14 Drawing Sheets

SENSOR CONTROLLED DRIVE UNIT INGRESS AND EGRESS

CROSS-REFERENCE TO RELATED APPLICATIONS

This application is a continuation of U.S. patent application Ser. No. 15/619,294, filed Jun. 9, 2017, entitled "SENSOR CONTROLLED DRIVE UNIT INGRESS AND EGRESS," the full disclosure of which is incorporated herein in its entirety.

BACKGROUND

Modern inventory systems and sorting systems, such as those in mail order warehouses, supply chain distribution centers, and custom-order manufacturing facilities, face significant challenges in responding to requests for storage or retrieval of inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

One strategy for increasing the efficiency of modern inventory system is to automate some portion of the inventory management tasks, including storing, sorting, and retrieving items. To that end, material handling systems have been devised that incorporate significant spans of floor space or vertical storage space that are frequented by autonomous or semi-autonomous robotic units. In order to maintain the operation of such systems, computerized controllers designate tasks for the various robotic units, while tracking their progress and forecasted locations in order to prevent collisions and to monitor the availability of units for new tasks. These systems, however, may operate based on inaccurate data when an autonomous unit has ceased functioning within the material handling system, or when an autonomous unit has been removed from use in the system without appropriate updates to the controller.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to inventory and sorting systems that employ drive units, shuttles, or inventory holders capable of sorting, storing, or moving items in an inventory system. Specific embodiments are directed to sorting systems employing automated or semi-automated drive units for transporting items in a substantially two-dimensional inventory system, e.g. from an item distribution system or source to one or more sorted destinations. Other specific embodiments are directed to sorting systems employing rail-based drive units or shuttles for transporting items to a three-dimensional inventory system, which may employ from one to several vertical levels and partial or full automation. Further embodiments herein are directed to an inventory system having multiple inventory holders and drive units for moving the inventory holders. Specifically, features herein are directed to systems and methods for sensing and logging ingress and egress of automated sorters or drive units to and from physical inventory management systems, as well as for rectifying virtual records of the inventory management systems, and particularly unexpected ingress or egress. To this end, the inventory system may include various forms of drive units, which can employ actuation units or some other mechanism configured to move inventory items between one place and other or between one inventory holder and another.

Embodiments herein are directed also to a monitoring system for automated detection of egress or ingress of a drive unit between first and second spaces in an inventory system. According to specific embodiments, a monitoring system can include a path for conveying a drive unit between the first and second spaces, the path being bounded on two sides and defining an intermediate space sized to contain the drive unit. A first threshold between first space and the intermediate space includes a first sensor configured to detect passage of the drive unit between the first space and the intermediate space. A second threshold between the intermediate space and the second space includes a second sensor configured to detect passage of the drive unit between the intermediate space and the second space. A third, identification sensor is arranged to scan the intermediate space and operable to read an identifier of the drive unit when the drive unit is positioned in the intermediate space. Embodiments will be better understood with reference to the following figures.

Figure 1:
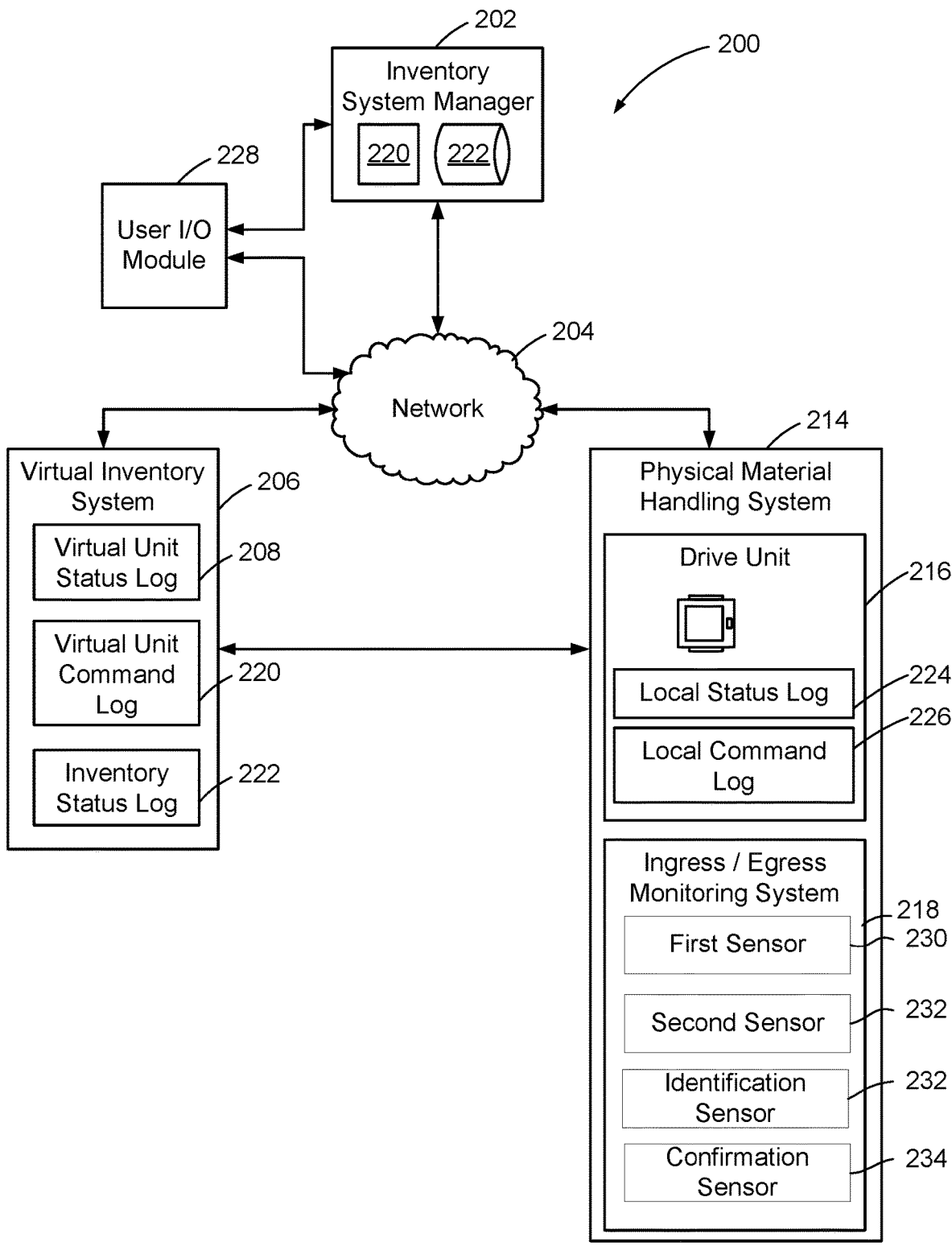
FIG. 1 is a simplified block diagram illustrating an example inventory management system employing an ingress/egress monitoring system for loading and unloading drive units in a material handling system, in accordance with embodiments.

FIG. 1 is a simplified block diagram illustrating an example inventory management system 200 employing an ingress/egress monitoring system 218 for loading and unloading drive units 216 in a material handling system 214, in accordance with embodiments. The inventory system 200 is controlled by an inventory system manager or controller 202, which includes at least one processor 220 and memory 222 containing executable instructions that drive the inventory system manager. The inventory system manager 202 operates to direct activity in a material handling system 214 and maintains, in parallel, a virtual inventory system 206. The virtual inventory system 206 is maintained to record and update nominal positions and actions of the components of the material handling system 214, for predicting actions at the material handling system, and for preventing collisions or other faults at the material handling system.

A material handling system 214 includes any suitable inventory storage, inventory sorting, or inventory retrieval space in which automated or partially automated systems are used to retrieve, transport, sort, or store inventory items. Suitable material handling systems include, e.g., two-dimensional floor spaces in which drive units retrieve, move, and deposit items at receiving stations for sorting or storage; and vertically stacked or three-dimensional storage spaces in which drive units or rail-mounted shuttles retrieve, move, and deposit items at receiving stations or storage locations. Detailed examples of material handling systems will be described below with reference to FIGS. 2, 7, and 9.

In the material handling system 214, at least one and typically multiple drive units 216 operate to retrieve, move, sort, and store items. The drive units 216 may be autonomous to varying degrees. In some cases, drive units 216 may receive instructions from an inventory manager 202 and subsequently perform retrieval, pathfinding, sorting, and storage tasks autonomously, including navigation around other drive units. In some cases, drive units 216 may be directed throughout the material handling system 214 by the inventory system manager 202. Each drive unit 216 can generally maintain at least limited status records, e.g., in a local status log 224 which can store status indicators such as drive unit operational status and drive unit position; and in a local command log 226, which can store instructions issued to the drive unit by the inventory system manager 202.

The virtual inventory system 206 is maintained in parallel with the material handling system 214, and simulates the material handling system including positions and actions of each respective drive unit loaded therein. Aspects of the virtual inventory system 206 may include virtual unit status logs 208 that track nominal positions and/or action histories of each drive unit 216, virtual unit command logs 210 that track future positions and commands issued to each drive unit, and inventory status logs 212 that track the nominal locations of respective inventory items based on the histories of commands and actions taken on the inventory items by the drive units. Data for updating the nominal positions and action histories stored at the virtual inventory system 214 can be updated on a periodic or continual basis via instructions from the inventory system manager 202, information from the drive units 216, or information from an ingress/egress monitoring system 218 connected with the material handling system 214.

An ingress/egress monitoring system 218 is connected with the material handling system at a periphery of the physical space defining the material handling system, such as at a border of a two dimensional floor space or at an end of a rail defining a rail-based inventory system. Various embodiments of ingress/egress monitoring systems are described in greater detail with reference to FIGS. 7-11. The ingress/egress monitoring system 218 contains multiple sensors and an intermediate space for holding a drive unit 216, similar to an airlock, to scan and positively identify each drive unit that passes through the ingress/egress monitoring system. In this manner, the ingress/egress monitoring system 218 operates to automatically catalog loading or unloading of drive units 216 into or out of the material handling system 214. According to some embodiments, the monitoring system 218 may include any combination of the following sensors: a first sensor 230 for detecting transit between the material handling system and the monitoring system across a threshold between the material handling system and monitoring system; a second sensor 232 for detecting transit between the monitoring system and an exterior environment across a threshold between the monitoring system and exterior environment; a third, identification sensor 232 for scanning and identifying a drive unit in the monitoring system; and a fourth, confirmation sensor 234 for positively detecting the presence of a drive unit in the monitoring system.

The ingress/egress monitoring system 218 provides information concerning the loading and unloading of drive units 216 at the material handling system to the inventory system manager 202, which updates the virtual inventory system 206 to add or remove drive units from the virtual inventory system. This information supplements commands issued by the inventory management system 202 and provides a failsafe method for accurately cataloging drive units 216 in the material handling system 214, which is particularly valuable in the event that a drive unit exits the material handling system unexpectedly, e.g. due to a fault such as a thermal event or low power event, to undergo routine maintenance, or when a drive unit is removed from the material handling system 214 by a user or by a robotic retrieval system. By providing this automated check on drive unit loading and unloading, the inventory management system 200 can prevent "phantom" drive units by enabling the virtual inventory system 206 to remove virtual drive units that no longer correspond to a drive unit 216 in the material handling system 214.

The inventory system manager or controller 202 is operable to receive instructions to retrieve, sort, or deposit individual items via the user I/O module 228, to instruct drive units 216 to perform the retrieval, sorting, or item storage tasks at the material handling system 214, or update the virtual inventory system 206 based on information received from the drive units or from the ingress/egress monitoring system 218. The inventory system manager 202 can communicate with integrated onboard controllers of each drive unit 216 and component of the physical and virtual inventory systems 214, 206, in some cases via the network 204, which can include any suitable wired or wireless data network.

The inventory management system 200 can be used to manage drive units and other autonomous or semiautonomous robotic units in various forms of material handling systems, including systems for storing or sorting individual inventory items, collections of inventory items, or even large-scale inventory holders containing many items. Some examples of various forms of drive units and inventory systems to which the inventory management system 200 can apply are described below with reference to FIGS. 2-16.

Figure 2:
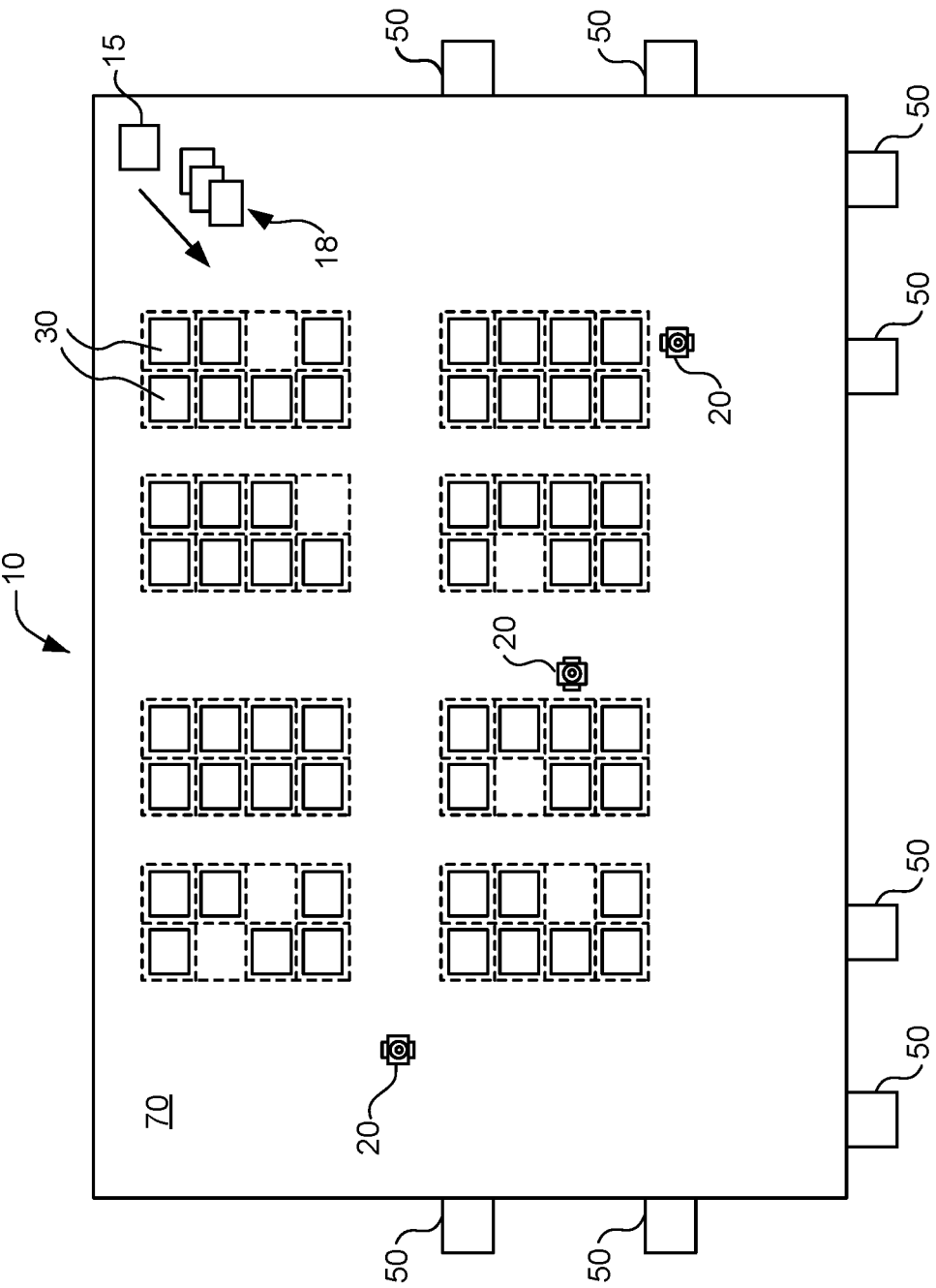
FIG. 2 illustrates components of an inventory system according to a particular embodiment.

FIG. 2 illustrates the components of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
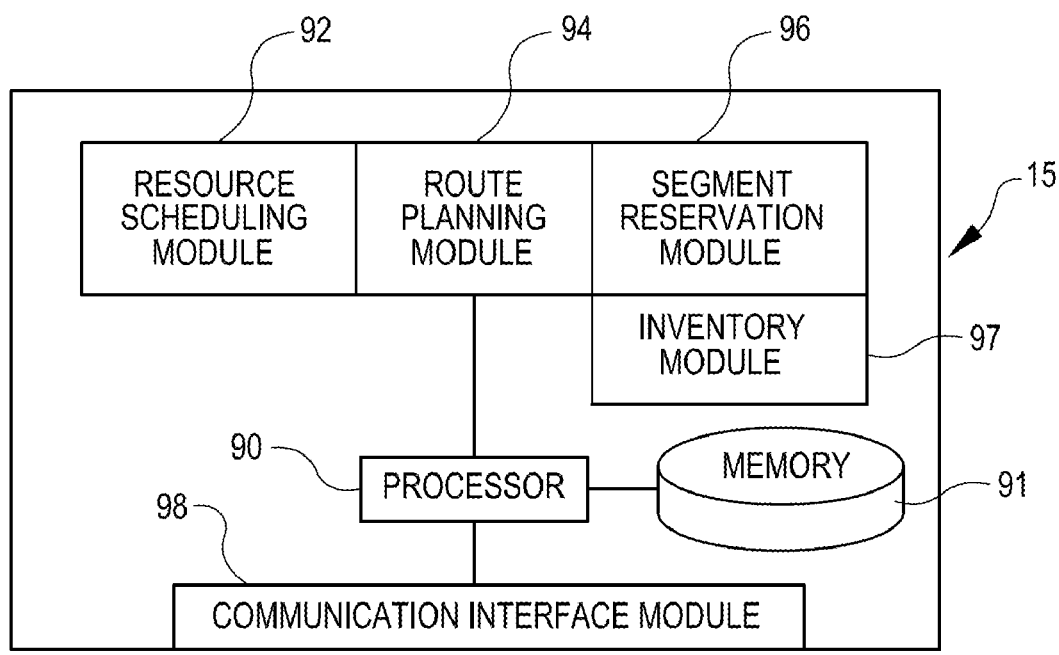
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
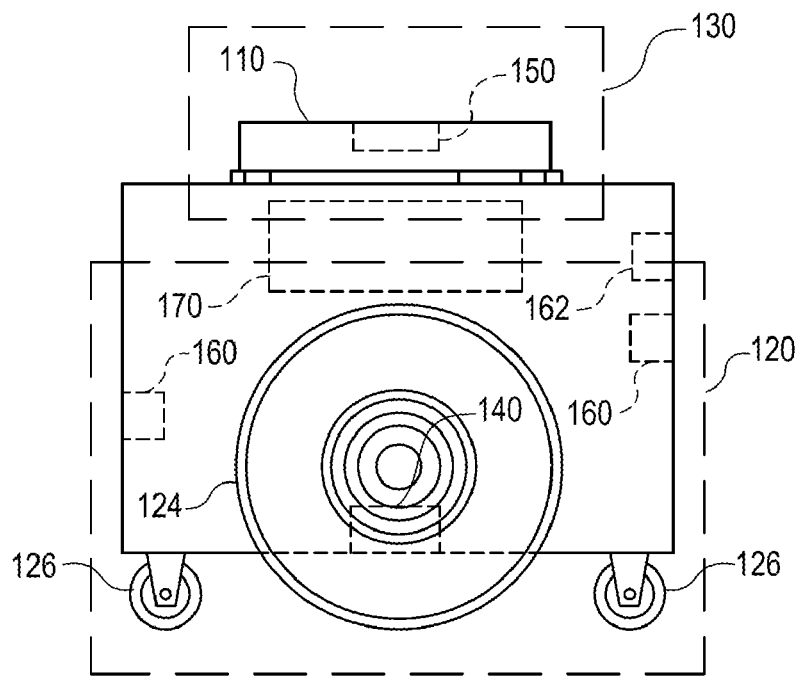
FIGS. 4 and 5 illustrate in greater detail an example mobile drive unit that may be utilized in particular embodiments of the inventory system shown in FIG. 2.
Figure 5:
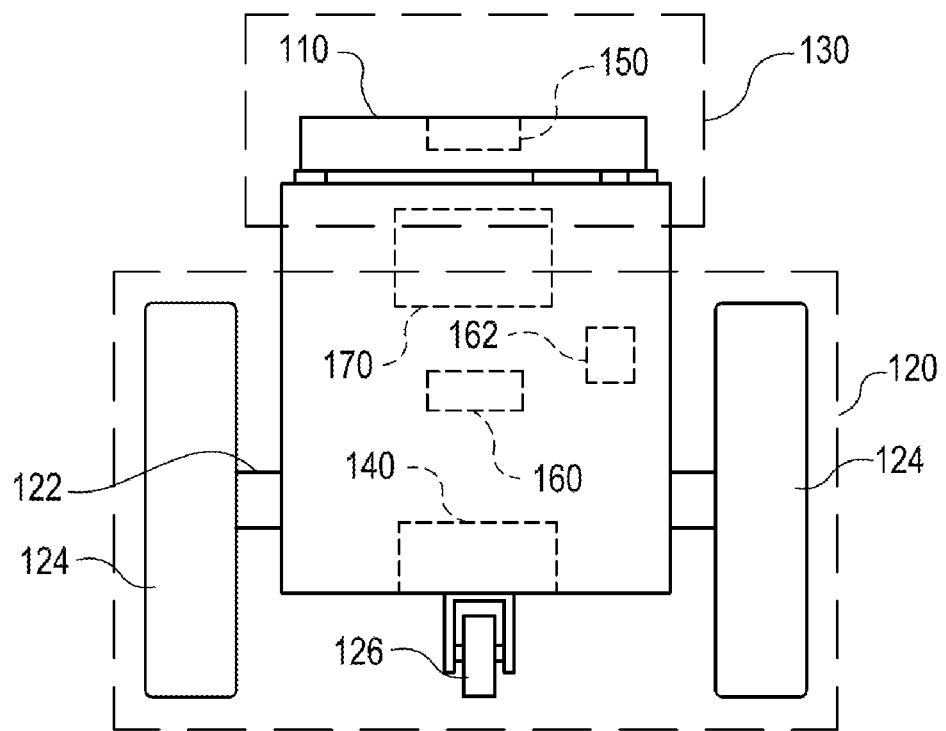

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
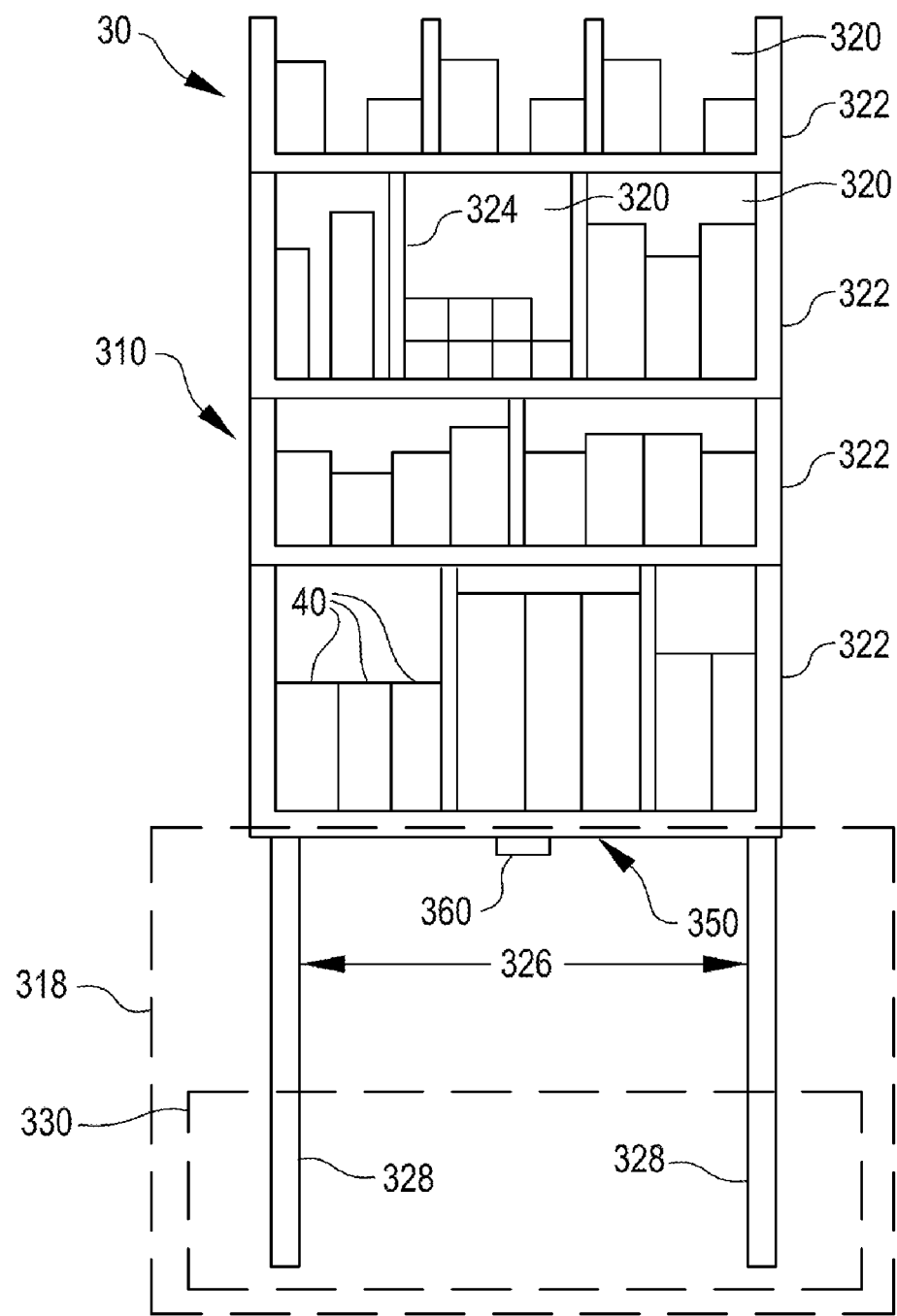
FIG. 6 illustrates in greater detail an example inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As described above, embodiments herein are directed to movement of inventory items 40 between inventory holders 30. In accordance with some embodiments, the mobile drive units 20 are utilized to perform the function of initiating and causing the movement of inventory items 40 between the adjacent inventory holders 30, or to other destinations within an inventory system. FIGS. 7-16 are directed to embodiments of inventory management systems employing ingress/egress monitoring systems to control the loading and unloading of drive units into the inventory management systems, in accordance with embodiments. Aspects of the inventory management systems described in FIGS. 7-16 can apply to mobile drive units and to inventory systems as discussed above with reference to FIGS. 2-6, according to various embodiments of the present disclosure.

Figure 7:
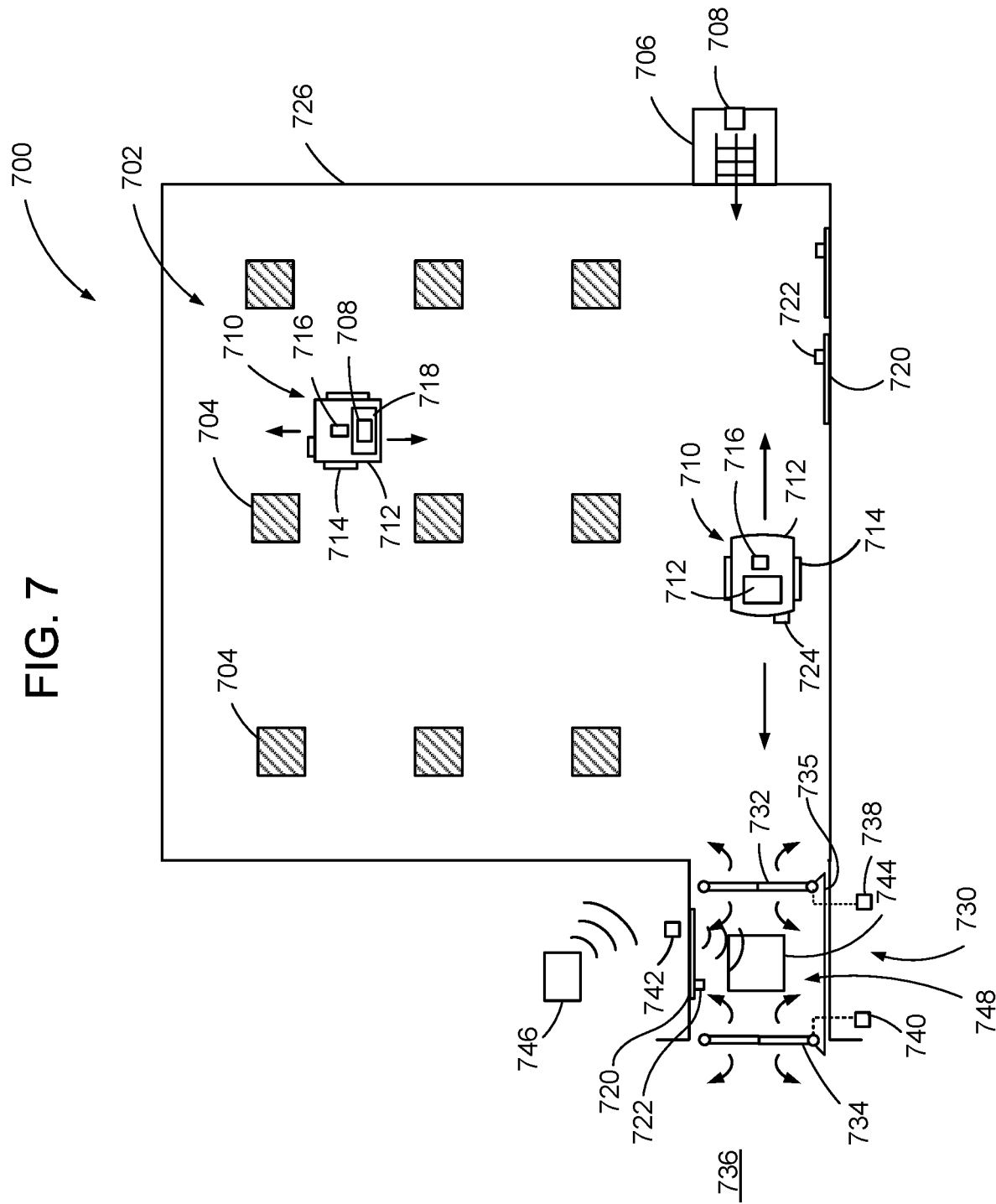
FIG. 7 is a schematic top view of a floor-based inventory management system employing drive units and a monitoring system for controlling loading and unloading of drive units.

FIG. 7 is a schematic top view of a floor-based inventory management system 700 employing drive units 710 and an ingress/egress monitoring system 730 for controlling loading and unloading of the drive units. The inventory management system 700 includes a material handling system 702 having a boundary 726 and including multiple item receiving stations 704. The receiving stations 704 may correspond to physical sorting locations (e.g., chutes or receiving stations) to which the inventory management system 700 routes items 708 for sorting, storage, or some combination of both. The items 708 can be transported throughout the inventory management system 700 by the drive units 710.

Drive units 710 can include any feature of mobile drive units described above with reference to FIGS. 2-6, according to embodiments. In some specific embodiments, drive units 710 can include a body 712, drive elements 714 such as wheels or tracks, a platform 718 for holding one or more items, and an identifier 716 that can be used to identify the specific drive element. Identifiers 716 may be unique to each drive unit 710, as in a serial number or the like; or in some cases, identifiers 716 may be provided to drive units on a temporary basis according to specific needs of the inventory management system 700. The identifier 716 may include any suitable electronic, magnetic, or visible indicator, such as RFID code or magnetic code, a machine readable barcode or indicium, or in some cases a human readable indicium such as a unit number, name, color, or the like. Each drive unit 710 may also include a charging port 724 for connecting with charging stations 720 and respective charging station ports 722 positioned in and around the material handling system 702.

In specific embodiments, the items 710 can be introduced to the inventory management system 700 by one or more item transfer components 706, which can be any suitable mechanism for transferring an item into the inventory system 700, such as a robotic arm, conveyor belt, discrete mechanical or robotic conveyor, chute, or other comparable device. Once loaded to a drive unit 710, an item 708 can be transported by the drive unit to any specific one of the individual receiving stations 704.

An ingress/egress monitoring system 730 is located adjacent to the material handling system 702 and connects the material handling system with an exterior space 736 via a path defining an intermediate space 748 between the material handling system and exterior space. The intermediate space 748 is bounded on the side of the material handling system 702 by a first actuatable element 732, and bounded on the side of the exterior space 736 by a second actuatable element 734. According to some embodiments, the first and second actuatable elements 732, 734 may be operably linked so that only one of the actuatable elements can be open at a time. The actuatable elements 732, 734 can be any suitable mechanical means of obstructing the path into or out of the monitoring system 730 that is moves in response to the passage of a drive unit therethrough, such as a gate, a physical switch, a raised panel in a floor, or the like. According to some embodiments, the actuatable elements 732, 734 are connected by a mechanical linkage 735 that closes each respective actuatable element when the other actuatable element is opened. In some cases, the mechanical linkage 735 can include a linked rigid rod or rod assembly connected with the actuatable elements 732, 734 to preserve a distance between the actuatable elements, thus preventing the actuatable elements from both being closed or both being open at the same time. According to some alternative embodiments, the actuatable elements 732, 734 can be operably linked by an electromechanical actuator that causes each respective electromechanical element to remain closed when the other of the electromechanical elements is open.

According to some embodiments, the first and second actuatable elements 732, 734 are connected to respective first and second sensors 738, 740 which are capable of detecting transit of a drive unit 710 across either of the actuatable elements. Some examples of suitable sensors for the first and second sensors include, e.g., a pressure panel that can be triggered by the weight of a drive unit, an induction coil that can be triggered by the presence of metal components of the drive unit, a physical switch that mechanically interferes with a drive unit, an electrical contact that contacts the drive unit, a displacement sensor connected with a gate, switch, or other movable, physical component that obstructs the first and second actuatable elements 732, 734, or the like.

In accordance with various embodiments, an identification sensor 742 is positioned adjacent or within the intermediate space 748 and is operable to scan the intermediate space to detect the identifier 716 of a drive unit 710 in the intermediate space as it transits the monitoring system 730. According to specific embodiments, the identification sensor 742 can be an RFID transponder capable of triggering and reading an RFID signal, a magnetic sensor capable of reading a magnetic code, a barcode reader or other optical reader, or in some cases can include a camera or group of cameras capable to capturing an image of a visual indicium on a drive unit 710. In some embodiments, a confirmation sensor 744 can be positioned in or adjacent to the intermediate portion 748 for detecting the presence or absence of a drive unit therein. Some examples of suitable sensors for the confirmation sensor include, e.g., a pressure panel that can be triggered by the weight of a drive unit, an induction coil that can be triggered by the presence of metal components of the drive unit, a physical switch that mechanically interferes with a drive unit, an electrical contact that contacts the drive unit, or any other suitable sensor. In some embodiments, the intermediate space 748 can also include a charging station 720 therein which is capable of connecting with a drive unit to provide power to the drive unit within the intermediate space. The inventory management system 700 can be controlled by a control element 736 corresponding to an inventory system management component or controller, such as controller 202 described in FIG. 1.

Figure 8:
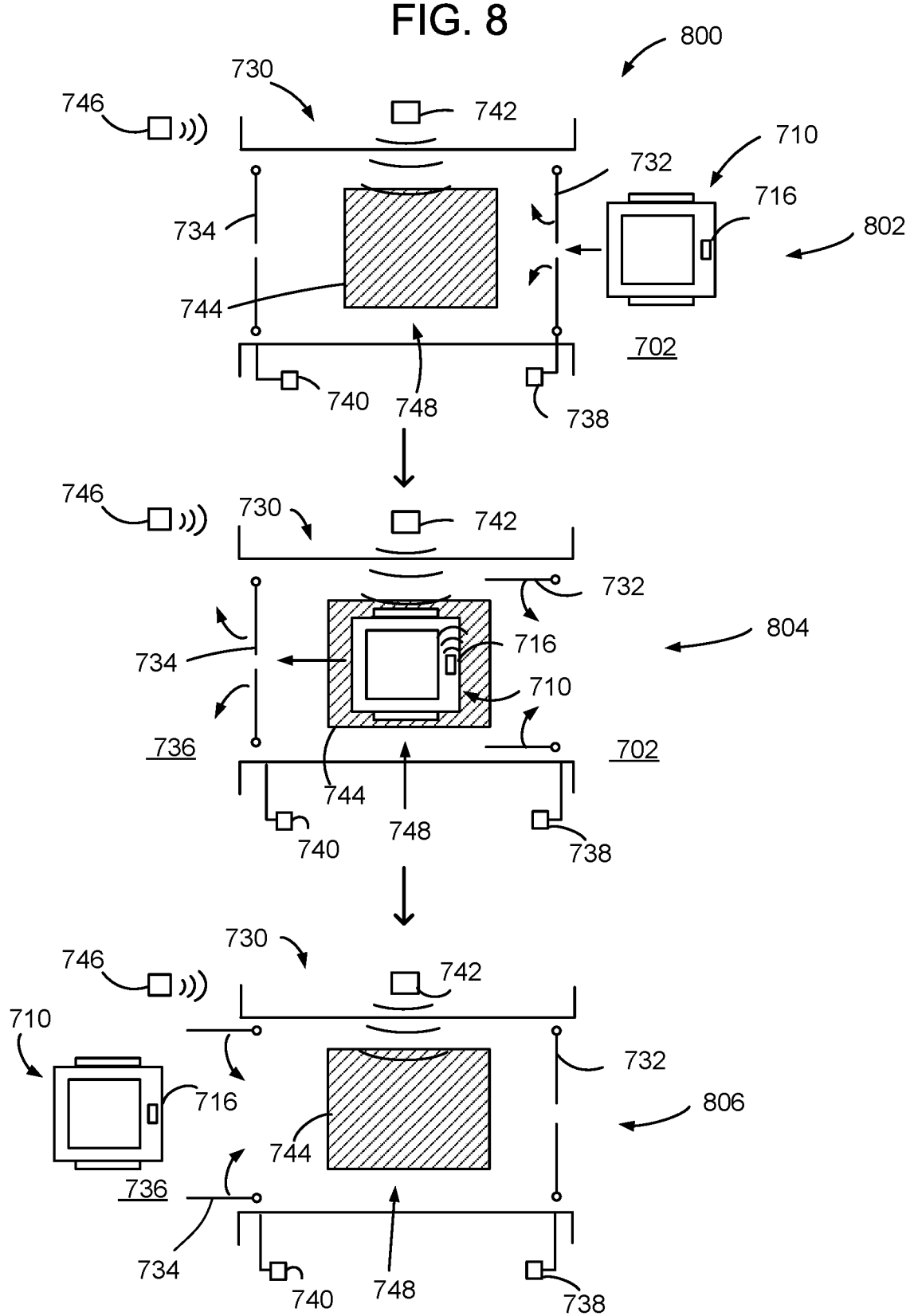
FIG. 8 is a simplified top view of a monitoring system for controlling ingress and egress of drive units showing drive unit progression through the monitoring system.

FIG. 8 is a simplified top view of the ingress/egress monitoring system 730 for controlling loading and unloading of drive units 710 showing a drive unit progression 800 through the ingress/egress monitoring system. In a first configuration 802, the drive unit 710 is positioned in the material handling system 702 and has not yet entered the monitoring system 730. To enter the monitoring system 730, the drive unit 710 exits the material handling system 702, crossing the first actuatable element 732 shown herein as a set of gates connected with the sensor 738. The inventory management system 746 can record the passage of the drive unit 710 across the first actuatable element 732. Once across the first actuatable element 732, the drive unit 710 is positioned in the intermediate space 748, as shown in the second configuration 804. According to some embodiments, the first sensor 738 can detect a direction in which the drive unit 710 traverses the first actuatable element 732. For example, where the first actuatable element 732 is a physical gate or switch that interacts mechanically with the drive unit 710, the directionality by which the physical gate or switch is moved can be sensed by the sensor 738 and communicated to the inventory management system 746.

In the second configuration 804, the drive unit 710 is positioned in the intermediate space 748, and the third, identification sensor 742 scans the drive unit to detect the identifier 716. In the case where the identifier 716 is an RFID chip or comparable device, the identifier 716 may transmit a code or other suitable identifying information back to the identification sensor 742, which can communicate the identifying information back to the inventory system manager 746. In some cases, the identification sensor 742 is operable to scan the intermediate space 748 in order to confirm the presence of the drive unit 710 therein. However, in some cases, a confirmation sensor 744 may be necessary to detect the drive unit 710 and communicate the presence of the drive unit to the inventory system manager 746. The confirmation sensor 744 as shown here is a pressure plate; however, in various embodiments the confirmation sensor 744 can be any suitable sensor for detecting the presence of a drive unit, such as an induction sensor, optical sensor, physical switch, or the like. Once scanned, the drive unit 710 can proceed through the second actuatable element 734 to exit the intermediate space 748 to the exterior space 736 to a third configurations 806.

In a third configuration 806, the drive unit 710 is positioned in the exterior space 736, having crossed the second actuatable element 734 and having triggered the second sensor 740 connected thereto. The second sensor 740 is operable to detect the transit of the drive unit 710 and communicate information to the inventory management system 746 indicating that the drive unit has traversed the second actuatable element 734. The second sensor 740 can operate in a similar manner to the first sensor 738, including, in some embodiments, sensing a direction of travel across the second sensor.

In accordance with embodiments, the ingress/egress monitoring system 730 can accommodate a drive unit 710 transiting the system in a reverse direction from that described above, e.g. beginning at the third configuration 806 and proceeding to the first configuration 802. Thus, over the course of a transit across the ingress/egress monitoring system 730, the inventory management system 736 can receive information from the monitoring system including confirmation that the drive unit 710 has passed fully through the monitoring system, an order in which the first and second actuatable elements 732, 734 were crossed, information to positively identify the drive unit. In some cases, the inventory management system 736 can extrapolate the direction of travel of the drive unit 710 based on the order in which the actuatable elements 732, 734 were crossed; but in other cases, the inventory management system may also have access to information concerning the specific direction in which the drive unit crossed each actuatable element. Similar ingress/egress monitoring systems may be used for systems that employ different forms of drive units, e.g., vertically mobile drive units, rail-mounted shuttles, or the like, as discussed below with reference to FIG. 9.

Figure 9:
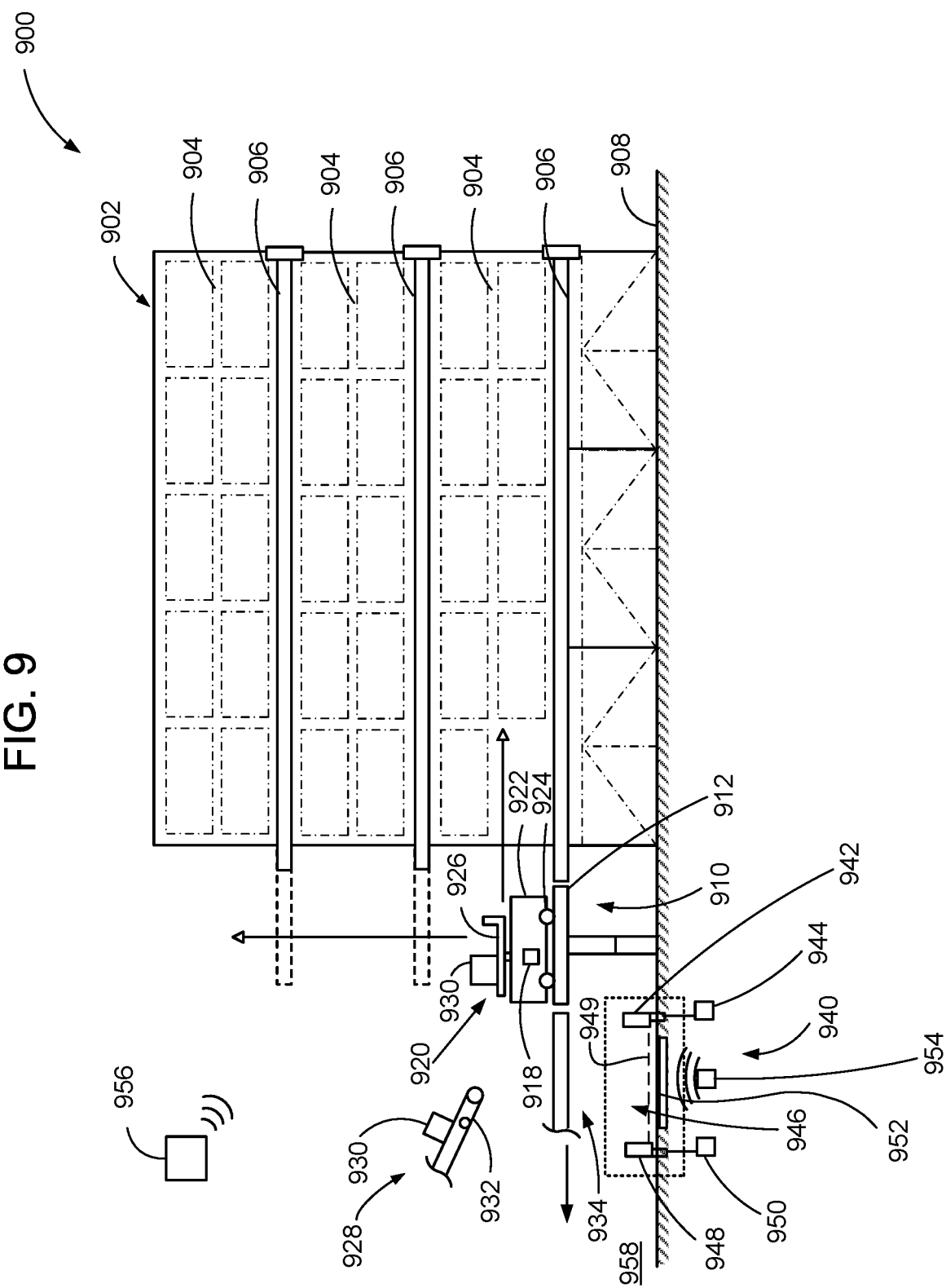
FIG. 9 is a schematic side view of a rail-based vertically stacked inventory management system employing shuttles and a monitoring system for controlling loading and unloading of shuttles.

FIG. 9 is a schematic side view of a rail-based vertically stacked inventory management system 900 employing shuttles 910 and an ingress/egress monitoring system 940 for controlling loading and unloading of shuttles. The inventory management system 900 includes a material handling system 902 defined by vertically stacked layers of receiving stations 904 and accessible by a series of rails 906. The receiving stations 904 may correspond to physical sorting locations (e.g., chutes, shelves, bins, or the like,) to which the inventory management system 900 routes items 930 for sorting, storage, or some combination of both. The items 930 can be transported throughout the inventory management system 900 by the drive units 920. Drive units 920 can be loaded or unloaded from the inventory management system 900 via an ingress/egress monitoring system 940, which has similar features to the ingress/egress monitoring systems discussed above with reference to FIGS. 1, 7, and 9, and under the control of an inventory system manager or controller 956.

Drive units 920 can include any feature of mobile drive units described above with reference to FIGS. 2-8, according to embodiments. In some specific embodiments, drive units 920 can include a body 922, drive elements 924 such as wheels or tracks, a platform 926 for holding one or more items, and an identifier 918 that can be used to identify the specific drive element. Identifiers 918 may be unique to each drive unit 920, as in a serial number or the like; or in some cases, identifiers 918 may be provided to drive units on a temporary basis according to specific needs of the inventory management system 900. The identifier 918 may include any suitable electronic, magnetic, or visible indicator, such as RFID code or magnetic code, a machine readable barcode or indicium, or in some cases a human readable indicium such as a unit number, name, color, or the like.

In specific embodiments, the items 930 can be introduced to the inventory management system 900 by one or more item transfer components 928, which can be any suitable mechanism for transferring an item onto a drive unit 920 in the inventory system 900, such as a conveyor belt 932, robotic arm, discrete mechanical or robotic conveyor, chute, or other comparable device. Once loaded to a drive unit 920, an item 930 can be transported by the drive unit to any specific one of the individual receiving stations 904.

The inventory system 902 can include any suitable number of vertically stacked rails 906, which may be accessible by the drive unit 920 via an access mechanism 910 such as a lift, elevator, inclined rail, or the like. According to some embodiments, the access mechanism 910 may be configurable to provide access to an ingress/egress monitoring system 940 through which the drive unit 920 can be loaded into or unloaded from the inventory management system 900.

An ingress/egress monitoring system 940 is located adjacent to the material handling system 902 and connects the material handling system with an exterior space 958 via a path defining an intermediate space 946 between the material handling system and exterior space. The intermediate space 946 is bounded on the side of the material handling system 902 by a first actuatable element 942, and bounded on the side of the exterior space 958 by a second actuatable element 948. According to some embodiments, the first and second actuatable elements 942, 948 are configured to assume open and closed configurations and to obstruct access by the drive unit 920 when closed. The first and second actuatable elements 942, 948 may be operably connected, e.g. via a mechanical linkage 949, such that only one of the actuatable elements can be opened at a time. In some cases, the linkage 949 can also prevent both of the actuatable elements 942, 948 from being closed simultaneously.

According to some embodiments, the first and second actuatable elements 942, 948 are connected to respective first and second sensors 944, 950 which are capable of detecting transit of a drive unit 920 across either of the actuatable elements. Some examples of suitable sensors for the first and second sensors include, e.g., a pressure panel that can be triggered by the weight of a drive unit, an induction coil that can be triggered by the presence of metal components of the drive unit, a physical switch that mechanically interferes with a drive unit, an electrical contact that contacts the drive unit, a displacement sensor connected with a gate, switch, or other movable, physical component that obstructs the first and second actuatable elements 942, 948, or the like.

An identification sensor 954 is positioned adjacent or within the intermediate space 946 and is operable to scan the intermediate space to detect the identifier 918 of a drive unit 920 in the intermediate space as it transits the monitoring system 940. According to specific embodiments, the identification sensor 954 can be an RFID transponder capable of triggering and reading an RFID signal, a magnetic sensor capable of reading a magnetic code, a barcode reader or other optical reader, or in some cases can include a camera or group of cameras capable to capturing an image of a visual indicium on a drive unit 920. In some embodiments, a confirmation sensor 952 can be positioned in or adjacent to the intermediate portion 946 for detecting the presence or absence of a drive unit therein. Some examples of suitable sensors for the confirmation sensor include, e.g., a pressure panel that can be triggered by the weight of a drive unit, an induction coil that can be triggered by the presence of metal components of the drive unit, a physical switch that mechanically interferes with a drive unit, an electrical contact that contacts the drive unit, or any other suitable sensor. The inventory management system 900 can be controlled by an inventory system manager 956 corresponding to, e.g., controller 202 described in FIG. 1.

Specific sensors and systems for use in an ingress/egress monitoring systems are described below with reference to FIGS. 10 and 11. The various sensors and systems usable in each of the monitoring systems herein disclosed may be substituted for use in any suitable inventory system except where expressly contraindicated.

Figure 10:
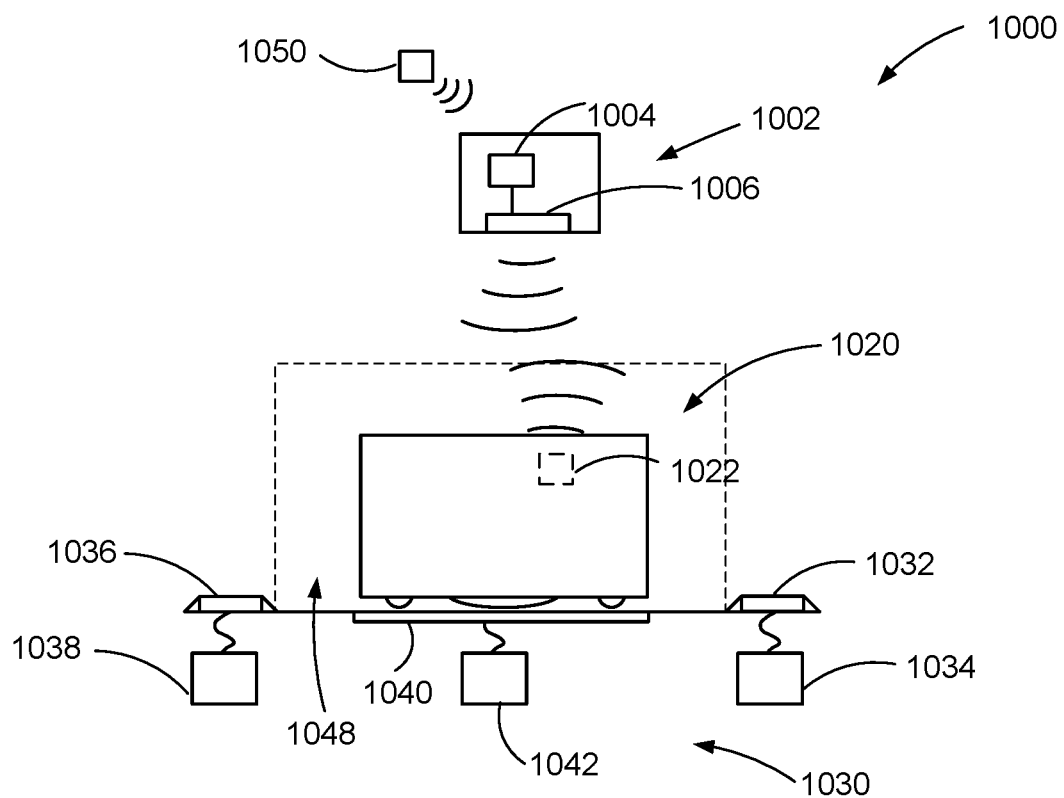
FIG. 10 is a side view showing a first example of a monitoring system for controlling loading and unloading of drive units.

FIG. 10 is a side view showing a first example of an inventory system 1000 configured to use an ingress/egress monitoring system 1030 for controlling loading and unloading of drive units 1020. The inventory system 1000 includes a controller 1050 corresponding to controller 202 described in FIG. 1, which communicates with each of the sensors disclosed herein. The system 1000 includes an intermediate space 1048 positioned between first and second actuatable elements 1032, 1036, which separate the intermediate space from respective first and second spaces outside the monitoring system 1030.

The first and second actuatable elements 1032 can, according to some embodiments, mechanically interact with the drive unit 1020 when the drive unit is moved across the actuatable elements. In some embodiments, the first and second actuatable elements 1032 can be formed of switches, pressure plates, or the like that do not block access by the drive unit 1020. A first sensor 1034 is connected with the first actuatable element 1032, and a second sensor 1038 is connected with the second actuatable element 1036. Each of the first and second sensors 1034, 1038 can communicate with the controller 1050 to communicate an instance of a drive unit 1020 passing into or out of the intermediate space 1048. A confirmation sensor 1042 can be used to detect whether the drive unit 1020 is positioned in the intermediate space 1048 by directly detecting the drive unit when positioned therein, e.g. via a pressure plate, switch, or the like. While the drive unit 1020 is positioned in the intermediate space 1048, a third, identification sensor 1002 can scan the intermediate space, e.g. via a scanner 1006 such as an RFID scanner, magnetic reader, infrared scanner, or the like. In response, an identifier 1022, such as an RFID chip, magnetic identifier, or the like, can communicate information concerning the identity of the drive unit 1020. In some embodiments, the identification sensor 1002 can communicate the information directly to the controller 1050. However, in some other embodiments, a local controller 1004 connected with the identification sensor 1006 may be used to process the information and relay the identity of the drive unit 1020 to the controller 1050.

Figure 11:
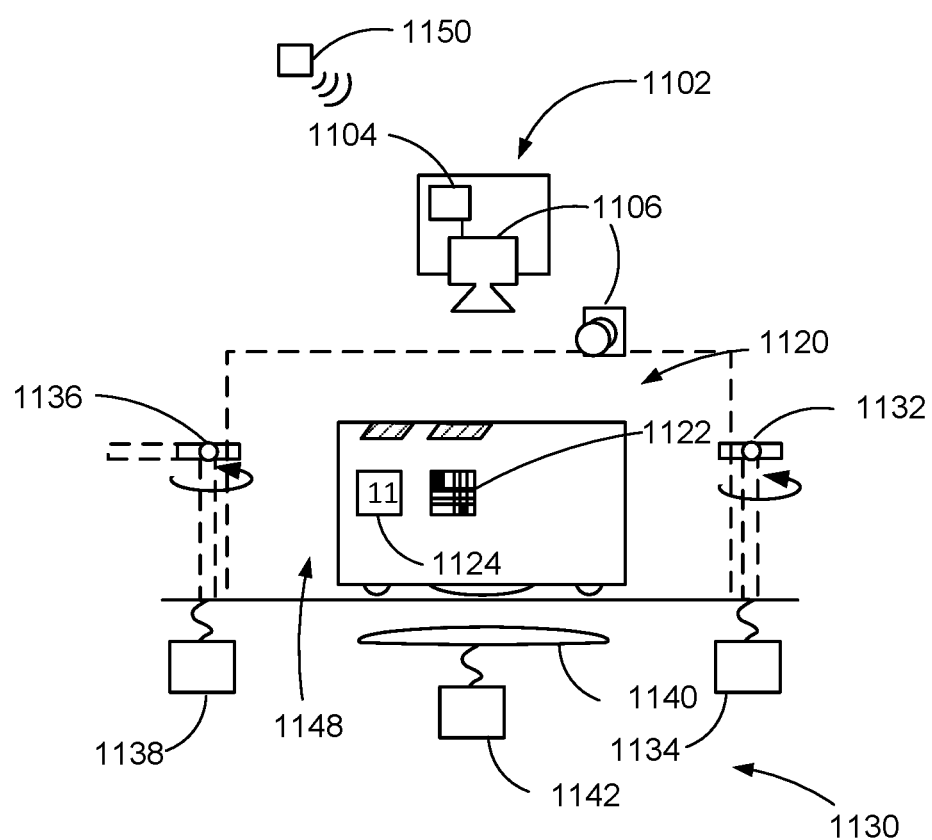
FIG. 11 is a side view showing a second example of a monitoring system for controlling loading and unloading of drive units.

FIG. 11 is a side view showing a second example of an inventory system 1100 configured to use an ingress/egress monitoring system 1130 for controlling loading and unloading of drive units 1120. The inventory system 1100 includes a controller 1150 corresponding to controller 202 described in FIG. 1, which communicates with each of the sensors disclosed herein. The system 1100 includes an intermediate space 1148 positioned between first and second actuatable elements 1132, 1136, which separate the intermediate space from respective first and second spaces outside the monitoring system 1130.

The first and second actuatable elements 1132 can, according to some embodiments, mechanically interact with the drive unit 1120 when the drive unit is moved across the actuatable elements. In some embodiments, the first and second actuatable elements 1132 can be formed of gates, panels, rails, or other suitable, pivotable structures that block access by the drive unit 1120 and which can provide a visible barrier or warning indicia to inhibit access by unauthorized personnel. A first sensor 1134 is connected with the first actuatable element 1132, and a second sensor 1138 is connected with the second actuatable element 1136. Each of the first and second sensors 1134, 1138 can communicate with the controller 1150 to communicate an instance of a drive unit 1120 passing into or out of the intermediate space 1148. A confirmation sensor 1142 can be used to detect whether the drive unit 1120 is positioned in the intermediate space 1148 by detecting the drive unit when positioned therein, e.g. via a sensor system operating at a slight remove from the intermediate space 1148, such as an inductive sensor, optical sensor, or the like. While a drive unit 1120 is positioned in the intermediate space 1148, the controller 1150 may cause the first or second actuatable elements 1132, 1136 to lock in place, e.g. via a mechanical lock or actuator, to prevent entry of another drive unit or to prevent the drive unit from being removed prior to identification. The controller 1150 may also prevent more than one of the first and second actuatable elements 1132, 1136 to open at one time, so that the actuatable elements act in the manner of an airlock, cycling each drive unit 1120 that passes through the monitoring system 1130 so that the drive unit proceeds fully through the monitoring system.

While the drive unit 1120 is positioned in the intermediate space 1148, a third, identification sensor 1102 can scan the intermediate space, e.g. via an optical sensor 1106 such as a camera, or the like. The optical sensor 1106 can read at least one of a visible, machine-readable indicium 1122 such as a bar code, color code, or the like; or a human-readable indicium 1124 such as a unit number, serial number, or the like. According to embodiments, the identification sensor 1102 can communicate information concerning the identity of the drive unit 1120. In some embodiments, the identification sensor 1102 can communicate the information directly to the controller 1150. However, in some other embodiments, a local controller 1104 connected with the identification sensor 1106 may be used to process the information and relay the identity of the drive unit 1120 to the controller 1150.

Figure 12:
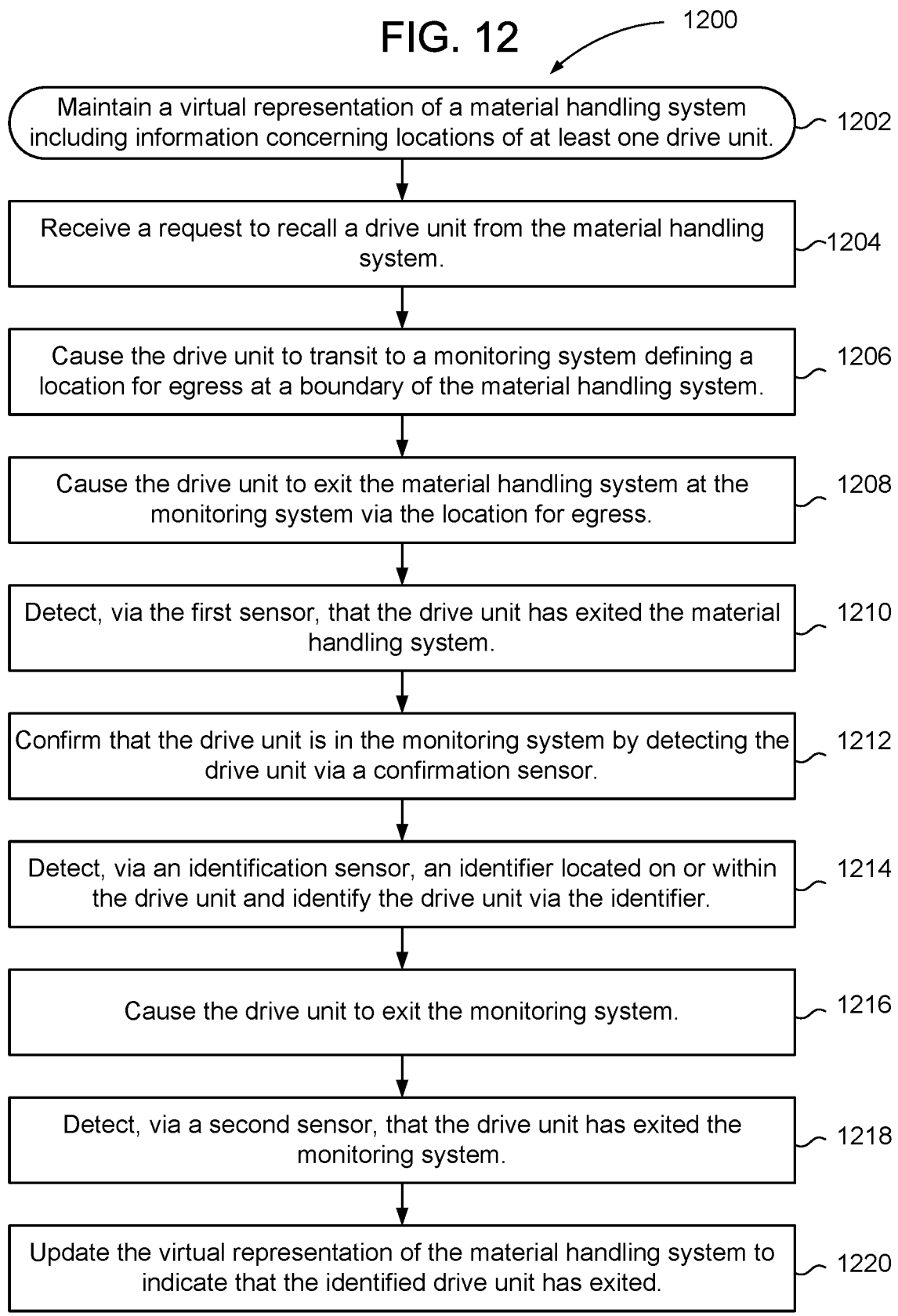
FIG. 12 illustrates a first example process for unloading a drive unit from an inventory management system via a monitoring system.
Figure 13:
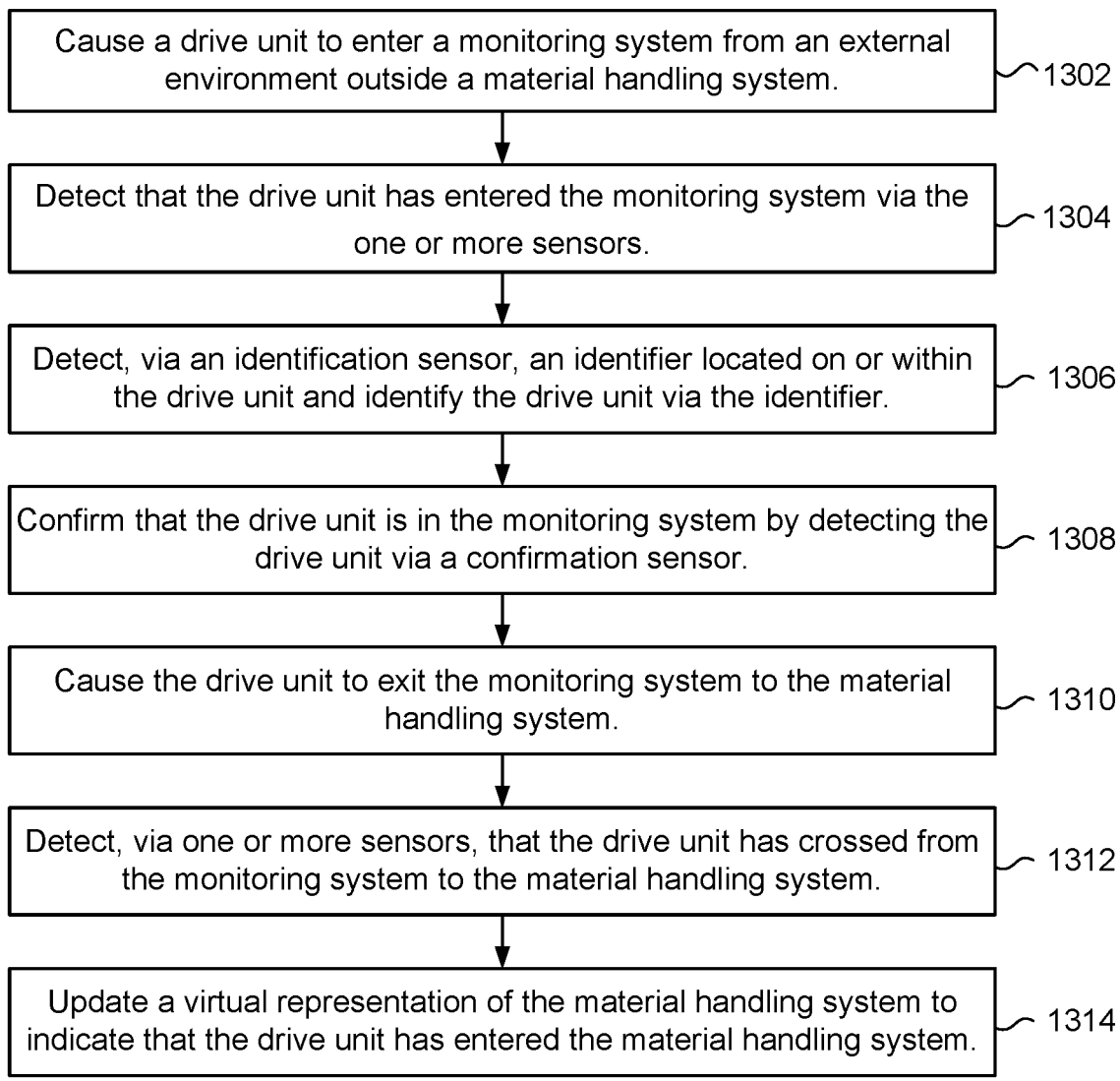
FIG. 13 illustrates a second example process for loading a drive unit to an inventory management system via a monitoring system.
Figure 14:
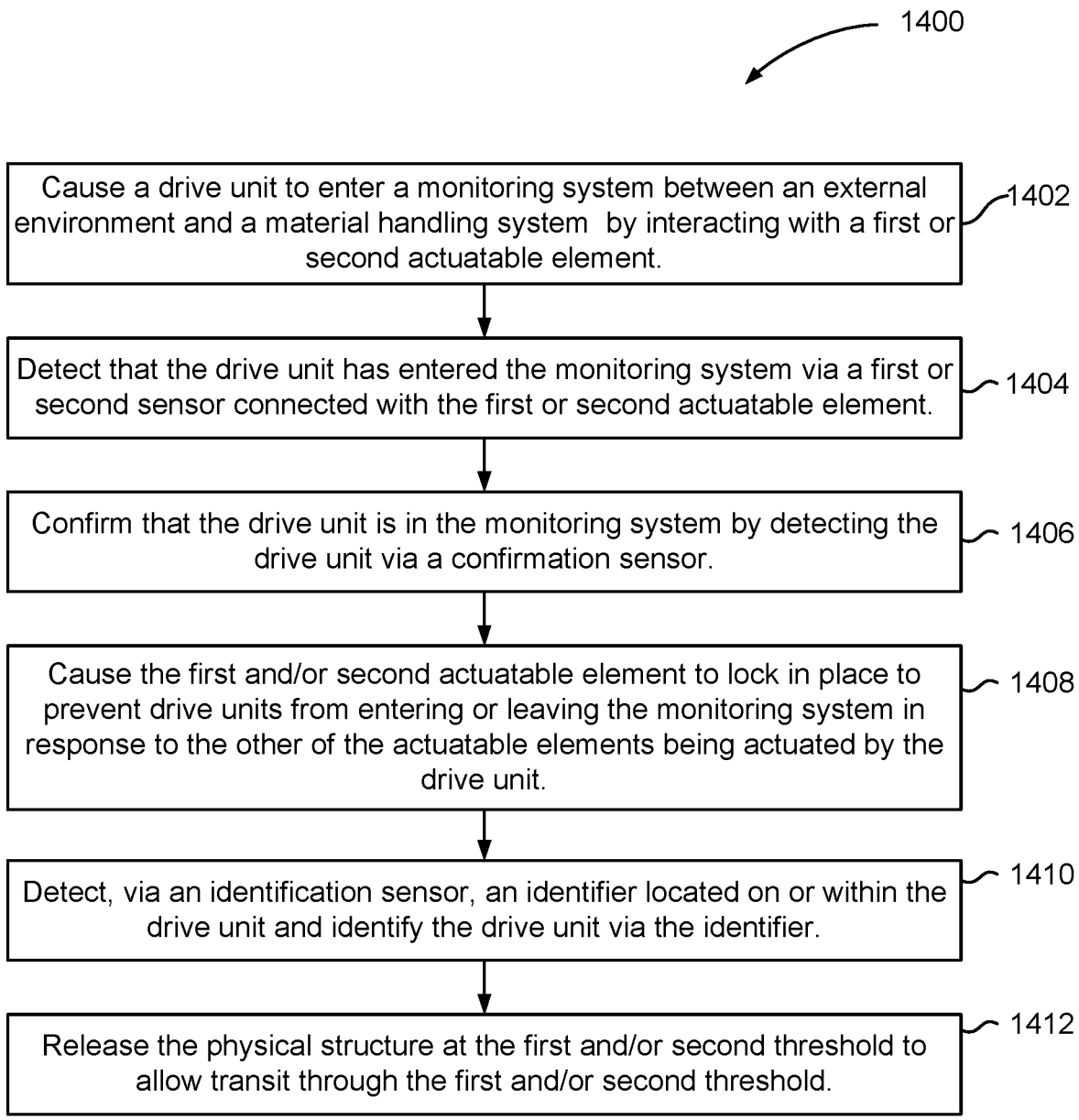
FIG. 14 illustrates a third example process for loading or unloading a drive unit to or from an inventory management system via a monitoring system.

FIGS. 12-14 illustrate various example processes for controlling loading and unloading of drive units via ingress/egress monitoring systems, in accordance with embodiments. Aspects of each example process 1200, 1300, 1400 may be performed, in some embodiments, by a system similar to the system 200 discussed with reference to FIG. 1. The system may be implemented by inventory systems as discussed with reference to FIGS. 1-11.

FIG. 12 illustrates a first example process 1200 for unloading a drive unit from an inventory management system via an ingress/egress monitoring system. In accordance with embodiments, an inventory management system can maintain a virtual representation of a material handling system in memory, including information concerning locations of at least one drive unit (act 1202). The system can receive a request to recall the drive unit from the inventory system, e.g. in response to an unforeseen error or event such as a mechanical fault, thermal event, or maintenance request for the drive unit, or in response to a regular event such as an indication that the drive unit requires regular maintenance, recharging, or is required at a different material handling system (act 1204). Once recalled, the drive unit can navigate, or can be drawn by an external system, to a monitoring system defining point of egress from the material handling system (act 1206).

Next, the system causes the drive unit to exit the material handling system via the monitoring system by crossing over a first actuatable element and into an intermediate section of the monitoring system (act 1208). According to some embodiments, e.g. where the monitoring system is bounded by mechanically linked first and second actuatable elements, (as shown in FIGS. 7, 9), the drive unit crossing the first actuatable element may cause the second actuatable element to close, and vice versa. A first sensor associated with the first actuatable element detects the transit of the drive unit across the first actuatable element, and communicates an indication to the system (act 1210). A confirmation sensor, associated with the intermediate section of the monitoring system, can confirm the presence of the drive unit in the intermediate section (act 1212). The system can use a third, identification sensor, also associated with the intermediate section, to scan the intermediate section for an identifier associated with the drive unit, which is used by the system to positively identify the drive unit (act 1214). Once the drive unit has been identified, the system can cause the drive unit to exit the monitoring system via a second actuatable element associated with a second sensor to, e.g., an exterior environment different from the material handling system (act 1216).

According to some embodiments, the system can determine that the drive unit is exiting the material handling system by detecting that the drive unit triggers the first sensor prior to the identification sensor. Similarly, the system may determine when the drive unit enters or re-enters the material handling system by the drive unit triggering the first sensor after it has been identified by the identification sensor. However, according to some embodiments, e.g. where first and second sensors are connected with the actuatable elements, the second sensor can detect that the drive unit has exited the monitoring system (act 1218). In such embodiments, the system may determine the direction of travel of the drive unit based on the order in which the drive unit triggers the first and second sensors.

Once the drive unit has exited the monitoring system, the system can update the virtual representation of the material handling system to indicate that the drive unit is no longer present, or can otherwise log the departure of the drive unit (act 1220). In some alternative embodiments, the system can update the virtual representation immediately upon identification of the drive unit in the monitoring system. According to certain embodiments, the system can also render the identified drive unit safe or inactive after the system detects that the drive unit has exited the material handling system, the monitoring system, or both. In some cases, rendering safe may include causing the drive unit to disconnect from an inventory controller and revert to taking direct commands, e.g. directly from a user or from a controller operable to direct the drive unit for maintenance, repair, or the like. In some cases, rending safe may include causing the drive unit to enter a low power state, or to power down. According to some embodiments, the system can cause the drive unit to disconnect from a power supply, which can include disconnecting a physical connection, in order to further render the drive unit safe, e.g., for repair or for other operator intervention.

FIG. 13 illustrates a second example process 1300 for loading a drive unit to an inventory management system via an ingress/egress monitoring system. The process 1300 can employ similar process steps as the process for unloading the drive unit as described above with reference to process 1200 (FIG. 12). First, the system can cause a drive unit to enter a monitoring system from an external space outside of a material handling system by crossing a second actuatable element between the monitoring system and the external space (act 1302). The system can detect that the drive unit has crossed into the monitoring system via a second sensor connected with the second actuatable element (act 1304). The system can then detect, via a third, identification sensor, a unique identifier associated with the drive unit in order to positively identify the drive unit (act 1306). A confirmation sensor can be used to confirm the presence of the drive unit within monitoring system (act 1308). Once the drive unit is identified, the system can cause the drive unit to exit the monitoring system and transit into the material handling system via a first actuatable element associated with a first sensor (act 1310). The system can detect entry of the drive unit into the material handling system via the first sensor (act 1312), and subsequently update a virtual representation of the material handling system to indicate that the drive unit is present in the inventory system (act 1314). In some alternative embodiments, the system can update the virtual representation upon identification of the drive unit in the monitoring system. In some embodiments, as discussed below with reference to FIG. 14, the monitoring system can restrict the movement of drive units into or out of the monitoring system while a drive unit is passing through the monitoring system.

FIG. 14 illustrates a third example process 1400 for loading or unloading a drive unit in an ingress/egress monitoring system. The process 1400 can employ similar process steps as the processes for loading and unloading a drive unit as described above with reference to processes 1200 and 1300 (FIGS. 12-13). In accordance with embodiments, an inventory management system can cause a drive unit to enter a monitoring system that defines a point of ingress to or egress from a material handling system with respect to an external space by crossing either a first or second actuatable element, the first and second actuatable elements being associated with respective first and second sensors (act 1402). The system can detect the transit of the drive unit into the monitoring system via the first or second sensors (act 1404). Optionally, once the drive unit is positioned in the monitoring system, the system can use a confirmation sensor to detect that the drive unit is present (act 1406). When the drive unit is positioned in the monitoring system, the system can cause a physical structure, such as a gate, rod, rail, or comparable structure connected with the first or second actuatable element to lock in place in order to prevent the drive unit from prematurely exiting the monitoring system, from leaving in a wrong direction, or to prevent a second drive unit from entering the monitoring system while the first drive unit is being scanned (act 1408). In some embodiments, both of the first and second actuatable elements are obstructed; but in some alternative embodiments, one or the other of the actuatable elements may be obstructed. According to some preferred embodiments, the system prevents both actuatable elements from being open simultaneously. Next, the system can detect, via a third, identification sensor, an identifier associated with the drive unit in order to positively identify the drive unit (act 1410). Once identified, the system unlocks the first or second actuatable element by releasing the physical structure at the first or second actuatable element, to permit egress of the monitoring system by the drive unit (act 1412).

Figure 15:
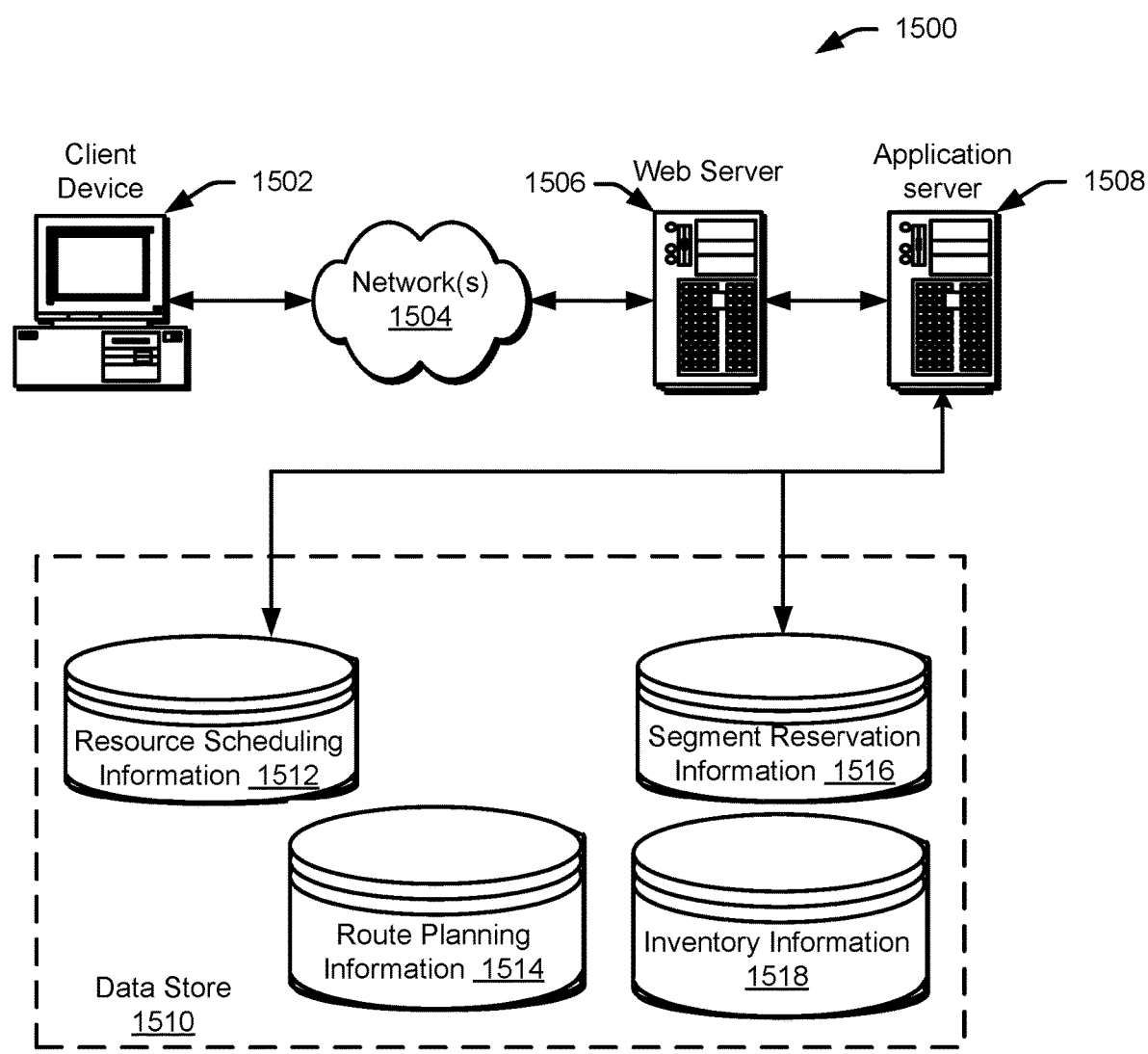
FIG. 15 illustrates an environment in which various features of the inventory system can be implemented, in accordance with at least one embodiment.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing information which can be used by modules described herein, such as resource scheduling information 1512, route planning information 1514, segment reservation information 1516, and/or inventory information 1518. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
    a first sensor configured to sense a drive unit moving into or out of a material handling area;
    an identification sensor configured to sense an identification element of the drive unit moving into or out of the material handling area; and
    a controller comprising a processor and memory containing executable instructions that, when processed by the processor, cause the controller to:
        maintain a virtual representation of the material handling area indicative of a location of the drive unit when the drive unit is disposed within the material handling area;
        detect, via the first sensor, that the drive unit has moved into or out of the material handling area;
        identify, via the identification sensor, the drive unit that has moved into or out of the material handling area; and
        in response to the detected movement of the drive unit into or out of the material handling area, update the virtual representation to reflect a presence or absence of the identified drive unit within the material handling area.

2. The system of claim 1, wherein the controller is further configured with executable instructions that, when executed by the processor, cause the controller to:
    cause the identification sensor to scan the drive unit in response to detecting the drive unit by the first sensor.

3. The system of claim 1, further comprising a first barrier positioned to block passage of the drive unit into or out of the material handling area, wherein the controller is further configured with executable instructions that, when executed by the processor, cause the controller to:
    cause the first barrier to open to permit passage of the drive unit subsequent to identifying the drive unit.

4. The system of claim 3, further comprising a second barrier positioned to block passage of the drive unit into or out of the material handling area, the second barrier separated from the first barrier by a nonzero distance sufficient to accommodate the drive unit, wherein the controller is further configured with executable instructions that, when executed by the processor, cause the controller to:
    cause the second barrier to close prior to causing the first barrier to open.

5. The system of claim 1, wherein the first sensor comprises one of a pressure panel or induction coil configured to respond to a presence of the drive unit.

6. The system of claim 1, wherein the first sensor comprises one of a displacement sensor or physical switch configured to activate in response to physical contact by the drive unit.

7. The system of claim 1, further comprising a second sensor configured to sense passage of the drive unit into or out of the material handling area, the first sensor and second sensor separated from each other by a distance sufficient to accommodate the drive unit.

8. The system of claim 7, further comprising a first actuatable element connected with the first sensor and a second actuatable element connected with the second sensor, the first actuatable element and the second actuatable element positioned across a path of the drive unit and separated from each other by a distance sufficient to accommodate the drive unit, wherein:
    the first actuatable element and the second actuatable element are configured to open and close; and
    the first actuatable element and the second actuatable element are configured to permit transit by the drive unit when open and to prevent transit by the drive unit when closed.

9. The system of claim 8, wherein the controller is further configured with executable instructions that, when executed by the processor, cause the controller to:
    detect whether one of the first actuatable element and second actuatable element is open; and
    in response to detecting that the one of the first actuatable element and second actuatable element is open, lock the other of the first actuatable element and second actuatable element closed.

10. The system of claim 8, wherein first actuatable element and the second actuatable element are mechanically linked by an actuator configured to prevent the first actuatable element and the second actuatable element from being open simultaneously.

11. The system of claim 8, wherein:
    the first actuatable element is operably connected with the first sensor to trigger the first sensor in response to the first actuatable element being acted on by the drive unit.

12. A computer-implemented method, comprising:
    maintaining a virtual representation of a material handling area of an inventory management facility including a location of a drive unit when the drive unit is disposed within the material handling area;

detecting, via a first sensor, the drive unit moving into the material handling area or the drive unit moving out of the material handling area;

identifying the drive unit by detecting, via an identification sensor, an identifier associated with the drive unit moving into or out of the material handling area; and updating the virtual representation, in response to detection of the drive unit moving into the material handling area or moving out of the material handling area by the first sensor, to reflect the identified drive unit moving into the material handling area or moving out of the material handling area.

13. The method of claim 12, further comprising:

determining a direction of transit by the drive unit as the drive unit enters or exits the material handling area; and updating the virtual representation of the material handling area to indicate that the identified drive unit has entered or exited the material handling area based in part on the determined direction of transit of the drive unit.

14. The method of claim 13, wherein the first sensor is operably connected with an actuatable element positioned in a path of the drive unit, the first sensor configured detect movement of the actuatable element when the actuatable element is acted upon by the drive unit, the method further comprising:

determining the direction of transit based on detecting, by the first sensor, a direction of the movement of the actuatable element.

15. The method of claim 13, further comprising:

detecting, via a second sensor separated by a nonzero distance from the first sensor, that the drive unit has entered or exited the material handling area; and determining the direction of transit by the drive unit as the drive unit enters or exits the material handling area by detecting an order in which the drive unit is detected by the first sensor and the second sensor.

16. A computer readable storage medium containing computer-executable instructions that, when executed by a processor, cause the processor to:

maintain a virtual representation of a material handling area of an inventory management facility including a location of a drive unit when the drive unit is disposed within the material handling area;

detect, via a first sensor, the drive unit moving into the material handling area or the drive unit moving out of the material handling area;

identify the drive unit by detecting, via an identification sensor, an identifier associated with the drive unit moving into or out of the material handling area; and update the virtual representation, in response to detection of the drive unit moving into the material handling area or moving out of the material handling area by the first sensor, to reflect the identified drive unit moving into the material handling area or moving out of the material handling area.

17. The computer readable storage medium of claim 16, wherein the computer-executable instructions are further configured to cause the processor to:

detect, via the first sensor, that the drive unit has entered a monitoring area at a location for ingress or egress at a boundary of the material handling area; and cause the identification sensor to scan the location for ingress or egress to identify the drive unit in response to the detecting that the drive unit has entered the monitoring area.

18. The computer readable storage medium of claim 17, wherein the computer-executable instructions are further configured to cause the processor to:

cause the drive unit to exit the monitoring area subsequent to identifying the drive unit.

19. The computer readable storage medium of claim 17, wherein the computer-executable instructions are further configured to cause the processor to:

release an actuatable element positioned at an outlet of the monitoring area to permit the drive unit to move into or move out of the material handling area subsequent to identifying the drive unit.

20. The computer readable storage medium of claim 16, wherein the computer-executable instructions are further configured to cause the processor to:

instruct the drive unit to transit to a monitoring area at a boundary of the material handling area.

* * * * *